United States Patent
Norimatsu et al.

(10) Patent No.: US 7,393,140 B2
(45) Date of Patent: Jul. 1, 2008

(54) ROLLING BEARING FOR A WHEEL OF VEHICLE AND A SEMI-FLOAT TYPE BEARING APPARATUS HAVING IT

(75) Inventors: Takayuki Norimatsu, Shizuoka-ken (JP); Masahiro Muranaka, Shizuoka-ken (JP)

(73) Assignee: NTN Corporation (JP)

( * ) Notice: Subject to any disclaimer, the term of this patent is extended or adjusted under 35 U.S.C. 154(b) by 630 days.

(21) Appl. No.: 10/874,450

(22) Filed: Jun. 23, 2004

(65) Prior Publication Data

US 2004/0258337 A1    Dec. 23, 2004

(30) Foreign Application Priority Data

Jun. 23, 2003   (JP)  ............................. 2003-178292

(51) Int. Cl.
  *F16C 32/00*  (2006.01)
  *F16C 13/00*  (2006.01)
(52) U.S. Cl. ..................... 384/448; 384/544; 384/589
(58) Field of Classification Search ................. 384/544, 384/589, 448; 324/173, 174
  See application file for complete search history.

(56) References Cited

U.S. PATENT DOCUMENTS

| | | | |
|---|---|---|---|
| 4,213,660 A | | 7/1980 | Yasui et al. |
| 4,864,231 A | | 9/1989 | Okumura et al. |
| 5,184,069 A | | 2/1993 | Adler et al. |
| 5,762,425 A | * | 6/1998 | Ouchi ..................... 384/448 |
| 5,873,658 A | | 2/1999 | Message et al. |
| 6,386,764 B1 | * | 5/2002 | Moore et al. ............. 384/448 |
| 6,573,705 B1 | * | 6/2003 | Tajima et al. ............ 324/174 |
| 2003/0001566 A1 | | 1/2003 | Tsuge et al. |
| 2003/0059140 A1 | | 3/2003 | Toda et al. |
| 2003/0072511 A1 | * | 4/2003 | Toda et al. ................ 384/544 |

FOREIGN PATENT DOCUMENTS

| | | |
|---|---|---|
| EP | 0 927 651 A2 | 7/1999 |
| EP | 0 927 651 A3 | 10/2001 |
| JP | 10-160744 | 6/1998 |

OTHER PUBLICATIONS

European Search Report dated Sep. 8, 2004.

* cited by examiner

*Primary Examiner*—Richard W L Ridley
*Assistant Examiner*—Justin Krause
(74) *Attorney, Agent, or Firm*—Harness, Dickey & Pierce, P.L.C.

(57) ABSTRACT

A vehicle wheel rolling bearing has a sealing device integrated with a magnetic encoder. A semi-float type bearing apparatus has said rolling bearing which can protect a magnetic encoder and improve the sensing ability of the detecting sensor. The rolling bearing has an inner member with a wheel hub having a wheel mounting flange and an inner ring formed with inner raceway surfaces. An outer member is formed with double row outer raceway surfaces opposite the inner raceway surfaces. Double row rolling elements are between the raceway surfaces. Sealing devices include an inboard sealing device with an annular seal fitted on the outer member. A pulsar ring is mounted on the inner member and has an encoder mounted on a cylindrical holding portion. The encoder is arranged opposite to the annular seal. The encoder includes magnetic poles formed by magnetic powder with alternating polarity along its circumferential direction. A detecting sensor passes through the cylindrical portion of the seal and opposes the encoder. A predetermined air gap is kept between the encoder and detecting sensor.

9 Claims, 6 Drawing Sheets

PRIOR ART

PRIOR ART

ROLLING BEARING FOR A WHEEL OF VEHICLE AND A SEMI-FLOAT TYPE BEARING APPARATUS HAVING IT

CROSS-REFERENCE TO RELATED APPLICATIONS

This application claims priority to Japanese Patent Application No. 2003-178292, filed Jun. 23, 2003, which application is herein expressly incorporated by reference.

FIELD OF THE INVENTION

The present invention relates to a vehicle wheel rolling bearing, and more particularly to a vehicle wheel rolling bearing having a sealing device integrated with a magnetic encoder. The magnetic encoder detects the wheel rotation speed. Also, the invention relates to a semi-float type bearing apparatus having the rolling bearing.

BACKGROUND OF THE INVENTION

Vehicle wheel rolling bearings with a sealing device integrated with a magnetic encoder to detect wheel rotation speed are known.

For example as shown in FIG. 4, a vehicle wheel rolling bearing has first and second annular sealing plates 62 and 63 fitted, respectively, on an inner ring 60 and an outer ring 61. Each of these sealing plates 62 and 63 has a substantially "L"-shaped cross-section formed, respectively, by a cylindrical portion 62a and 63a and a radially extending portion 62b and 63b. The sealing plates 62 and 63 are arranged opposite to each other. The radially extending portion 62b of the first sealing plate 62 has an encoder 64 to detect the wheel rotation speed. The encoder is bonded to the portion 62b, via vulcanization, at the inboard side of the bearing. The encoder 64 is made of a rubber magnet where magnetic substance powder is mingled and N and S poles are alternately magnetized along the circumferential direction of the encoder.

The second sealing plate 63 has a sealing member 65 bonded via vulcanization. The sealing member 65 has an integrally formed side lip 65a that slidably contacts with the radially extending portion 62b of the first sealing plate 62b. Other integrally formed radial lips 65b and 65c slidably contact with the cylindrical portion 62a. A tip of the radially extending portion 62b of the first sealing plate 62 opposes the cylindrical portion 63a of the second sealing plate 63. A slight radial gap is formed between the two forming a labyrinth seal 66.

In such a vehicle wheel rolling bearing with the sealing device integrated with the magnetic encoder, dust or sand sometimes enter into a gap formed between the surfaces of the encoder 64 and a detecting sensor (not shown) arranged opposite to the encoder 64. Thus, the dust or sand may abrade or damage the surface of the encoder 64. This is because the encoder 64 is mounted on the inboard side of the first sealing plate 62 forming a slinger and is exposed to ambient circumstances. In order to overcome this problem, a vehicle wheel rolling bearing has been proposed as shown in FIG. 5.

In this rolling bearing, a pulse generating ring 71, comprising a holding plate 71a and an encoder 71b magnetized in multipoles, is fitted on a rotating inner ring 70. The encoder 71b is made, for example, of elastomer filled with magnetic pieces and bonded to the holding plate 71a, via vulcanization. A cover member 72, made of non-ferromagnetic material, is mounted on an outer ring 73 of the stationary side. The cover 72 has a sealing lip 74 bonded via vulcanization. This sealing lip 74 slidably contacts the pulse generating ring 71 and protects the encoder 71b from influences from ambient circumstances. A detecting sensor 75 directly contacts the cover member 72. Radio signals are transmitted through the cover member 72. Thus, it is possible to prevent the penetration of dust or sand into a gap formed between the surfaces of the encoder 71b and detecting sensor 75. Accordingly, abrasion or damage to the surface of the encoder 71b is prevented.

Japanese Laid-open Patent Publication No. 160744/1998 illustrates such a vehicle wheel rolling bearing. However, since the pulse generating ring 71 is arranged so that it radially extends and the signal detection of the detecting sensor 75 is carried out through the cover member 72, it is difficult to ensure sufficient area of the pulse generating ring 71 because of the limitation of radial space of the bearing and thus detecting sensitivity is also reduced. In addition, although the cover member 72 can prevent penetration of dust or sand into the space of the encoder 71b, it increases the distance between the encoder 71b and the detecting sensor 75 further reducing detecting sensitivity.

SUMMARY OF THE INVENTION

It is, therefore, an object of the present invention to provide a vehicle wheel rolling bearing with a sealing device integrated with a magnetic encoder. Also, the invention provides a semi-float type bearing apparatus with the rolling bearing protecting the magnetic encoder and improving the sensing ability of the detecting sensor.

In order to achieve the invention, a vehicle wheel rolling bearing comprises an inner member with a wheel hub integrally formed with a wheel mounting flange at an outboard side end. An integrally formed stepped portion of smaller diameter axially extends from the wheel mounting flange. An inner ring is fitted on the stepped portion. At least one double row inner raceway surface is formed on the inner ring's outer circumferential surface. An outer member is mounted on a stationary member and is formed with double row outer raceway surfaces on its inner circumferential surface opposite to the inner raceway surfaces. A double row rolling elements is arranged between the outer and inner members. A sealing device seals the annular spaces between the outer and inner members. An inboard sealing device of the sealing devices comprises an annular seal fitted on one end of the outer member forming the stationary side. A pulsar ring is mounted on an end of a larger diameter of the inner member forming the rotary side. The pulsar ring has an encoder mounted on a cylindrical holding portion arranged opposite to the annular seal. The encoder includes magnetic poles formed by magnetic powder alternating the polarity along its circumferential direction. A detecting sensor is arranged passing through the cylindrical portion of the seal or through the end of the outer member. The detecting sensor opposes the encoder keeping a predetermined air gap therebetween.

According to the present invention, it is possible to prevent leakage of lubricating grease contained within the bearing and also penetration of rain water or dust into the bearing from the ambient circumstances. This is accomplished by the inboard sealing device, which comprises an annular seal fitted on one end of the outer member forming the stationary side, a pulsar ring, mounted on an end of larger diameter of the inner member forming the rotary side and having an encoder mounted on a cylindrical holding portion arranged opposite to the annular seal and including magnetic poles formed by magnetic powder alternating the polarity along its circumferential direction, and a detecting sensor, arranged passing through the cylindrical portion of the seal or through the end of the outer member and opposed to the encoder keeping a predetermined air gap therebetween. In addition, it is possible to provide a vehicle wheel rolling bearing with a sealing device integrated with a magnetic encoder which can protect the encoder and improve the sensing ability of the detecting sensor. Furthermore, since the detecting sensor is arranged directly opposite to the encoder, without any obstruction such as the cover member, it is possible to reduce the air gap between the two. This remarkably improves the sensing ability as well as the detecting accuracy.

According to the invention, the inboard sealing device of the sealing devices comprises an annular seal of "U" shaped cross-section having a cylindrical portion fitted on the outer circumferential surface of the end of outer member. The pulsar ring has the cylindrical holding portion arranged opposite to the cylindrical portion of the seal with the encoder mounted on it. This arrangement makes it possible to ensure a sufficient area for the encoder without limitation of radial space of the bearing.

According to the invention, one of the double row inner raceway surfaces is formed directly on the outer circumferential surface of the wheel hub. The other of the double row inner raceway surfaces is formed on the outer circumferential surface of the inner ring. This arrangement is a so-called third generation structure and makes it possible to increase the strength of the wheel hub and reduce the size and weight of the bearing.

According to the invention, the inboard side end of the wheel hub is plastically deformed radially outward to form a caulked portion. The inner ring is axially secured relative to the wheel hub by the caulked portion. This arrangement is a so-called self-retaining structure. Accordingly, it is possible to make the assembly of the bearing to a vehicle easy as well as to keep an amount of preload for a long term.

According to the invention, core members of the pulsar ring and seal are formed by press working of a steel sheet. The core member of the pulsar ring is made of magnetic steel sheet and the core member of the seal is made of non-magnetic steel sheet. This arrangement enables an increase of the magnetism of the encoder and prevents adverse effect of the core member adding to the sensing ability.

According to the invention, a vehicle wheel bearing of the semi-float type comprises an axle housing supported under a body of a vehicle. An extending driving shaft passes through the axle housing and is connected to an inner member of a vehicle wheel rolling bearing. The rolling bearing is arranged between the driving shaft and an opening of the axle housing to transmit a torque between the driving shaft and the inner member. This vehicle wheel bearing of the semi-float type makes it possible to prevent leakage of lubricating grease contained within the bearing and also prevents penetration of lubricating oil from the differential apparatus to the bearing. Also it is possible to protect the encoder and to prevent attraction of abraded powder mingled in the lubricating oil near or on the encoder and prevent reduction of the sensing ability.

Preferably, according to the invention, the driving shaft and the inner member are detachably connected to each other via a serration mechanism. This arrangement makes it easy to assemble the roller bearing to a vehicle and to improve workability during service of the vehicle.

Preferably, according to the invention, the seal has integrally formed sealing lips which intimately contact the inner surface of the axle housing. This arrangement makes it possible to prevent penetration of lubricating oil from the differential apparatus to the bearing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
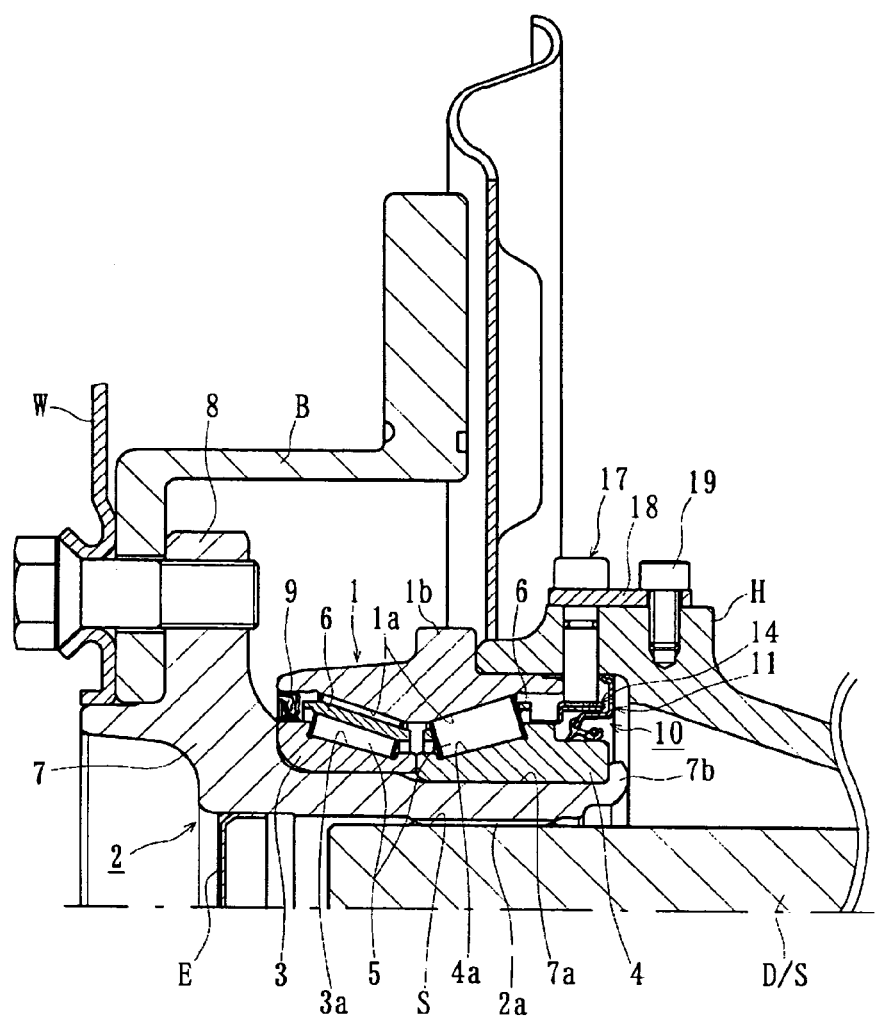
FIG. 1 is a longitudinal-section view of a first embodiment of a vehicle wheel bearing of a semi-float type of the present invention.
Figure 1A:
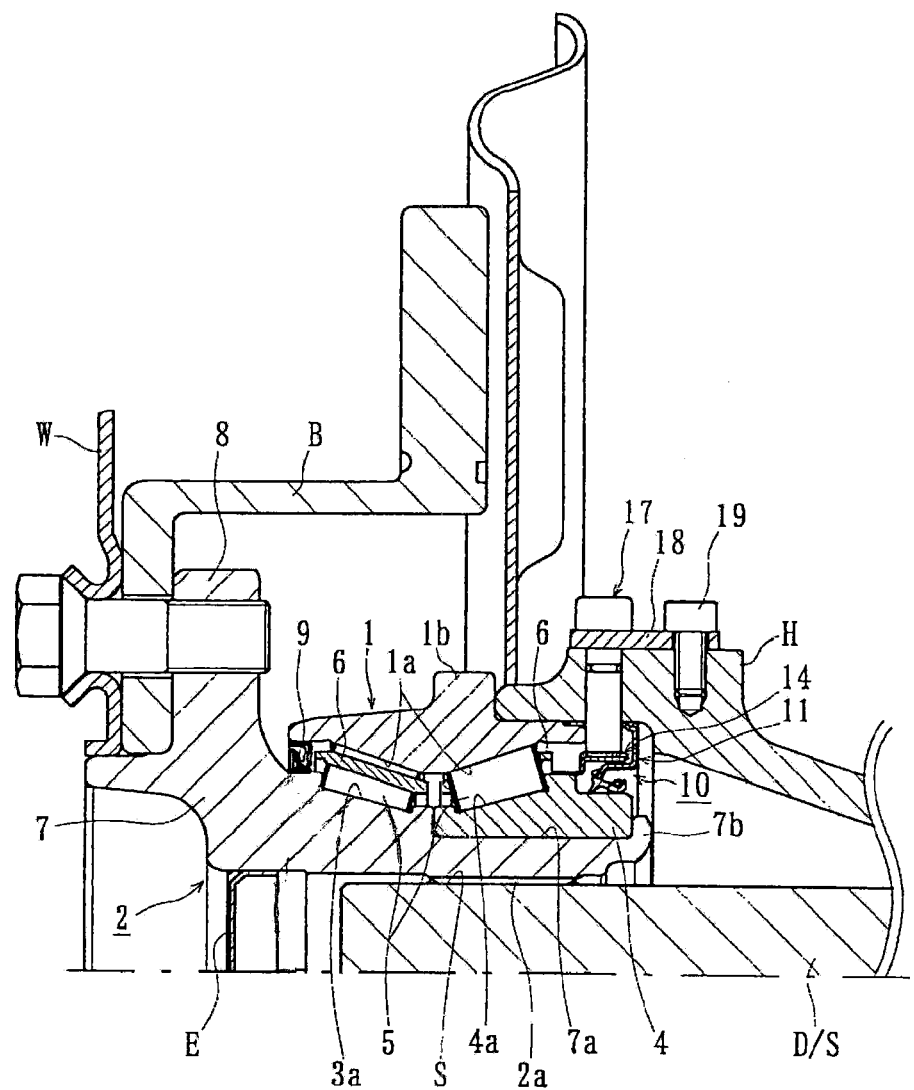
FIG. 1a is a view like FIG. 1 illustrating an inner race surface on the wheel hub.
Figure 2:
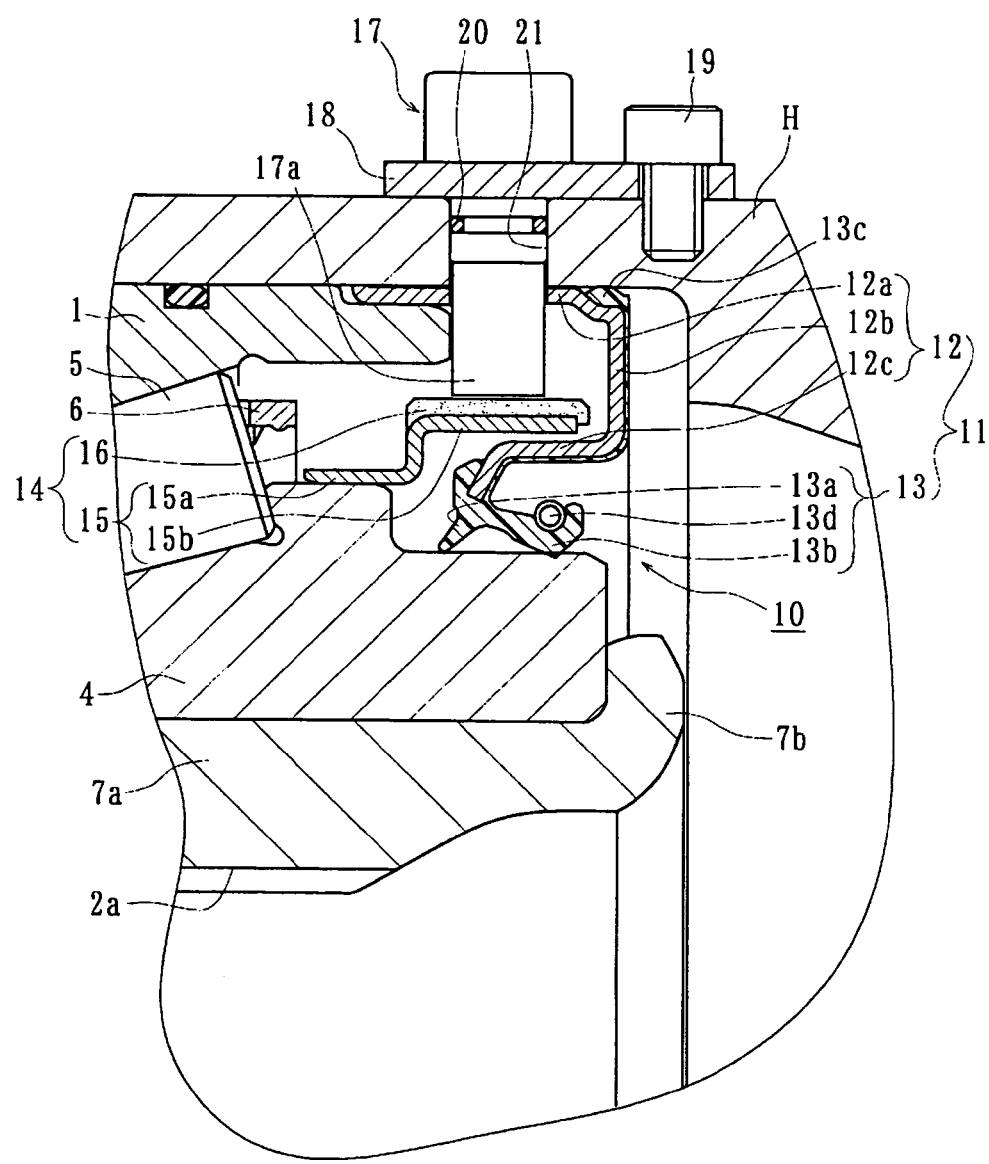
FIG. 2 is a partially enlarged longitudinal-section view of FIG. 1.

Preferred embodiments of the present invention will be described with reference to the accompanied drawings. FIG. 1 is a longitudinal-section view of a first embodiment of a vehicle wheel bearing of the semi-float type of the present invention. FIG. 2 is a partially enlarged longitudinal-section view of FIG. 1. In the description of the present invention, a side of a bearing positioned outward of the vehicle when it is mounted on the vehicle is referred to as "outboard" side (the left side in a drawing), and a side inward of the vehicle is referred to as "inboard" side (the right side in a drawing).

In a vehicle wheel bearing of the present invention, a driving shaft D/S of the semi-float type is rotatably supported within an axle housing H supported under a floor of a body of the vehicle. Accordingly, one end of the axle housing H is connected to a differential apparatus housing (not shown) and an opening of the other end of the axle housing H is connected to an outer member 1 of the vehicle wheel rolling bearing. Power from an engine (not shown) is transmitted to a wheel W, via a serrated connection (or spline) S formed on the outer circumferential surface of the driving shaft D/S and a serration (or spline) 2a formed on the inner circumferential surface of an inner member 2. An end cap E is mounted on an outboard end of the inner member 2 to prevent leakage of lubricating oil from the differential apparatus to ambient circumstance.

The bearing of FIG. 1 is a double row tapered roller bearing. The outer member 1, on an inner circumferential surface, is formed with double row tapered outer raceway surfaces 1a and 1a. A pair of inner rings 3 and 4, on their outer circumferential surface, is formed with double row tapered inner raceway surfaces 3a and 4a. The raceway surfaces 3a, 4a are opposite to outer raceway surfaces 1a and 1a. Double row rolling elements (tapered rollers) 5 and 5 are arranged between the outer raceway surfaces 1a and 1a and the inner raceway surfaces 3a and 4a. The double row rolling elements 5 and 5 are held by plastic cages 6 and 6.

A wheel hub 7 is integrally formed with a wheel mounting flange 8 at its outboard end. The flange mounts the wheel W via a brake rotor B. A cylindrical stepped portion 7a, of smaller diameter, axially extends from the wheel mounting flange 8. The pair of inner rings 3 and 4 are press fitted on the stepped portion 7a of the wheel hub 7. In this specification, the inner member 2 includes the pair of inner rings 3 and 4 and the wheel hub 7. The end of the stepped portion 7b is plastically deformed radially outward to form a caulked portion 7b to prevent the inner rings 3 and 4 from axially coming off the wheel hub 7. In this arrangement, adopting such a self-retaining structure, since it is unnecessary to control an amount of preload to be applied to the inner rings, as carried out in the prior art using a nut, it is possible to maintain the amount of preload for a long period of time.

The outer member 1 has a integrally formed flange 1b to position it relative to the axle housing H. Sealing devices 9 and 10 are fitted in the ends of the outer member 1. The outboard sealing device 9 prevents leakage of lubricating grease contained within the bearing. Also, it prevents penetration of rain water or dust from the ambient circumstance into the bearing. The inboard sealing device 10 prevents leakage of lubricating grease contained within the bearing. Also, it prevents penetration of lubricating oil from the differential apparatus into the bearing. Although a double row tapered roller bearing using tapered roller as rolling elements 5 is illustrated, a double row angular ball bearing using balls may be also used. Although there is also shown, in this embodiment, a so-called second generation structure, where the pair of inner rings 3 and 4 are press fitted on the stepped portion 7a of the hub wheel 7, it is possible to adopt a bearing of a third generation where the inner raceway surfaces are directly formed on the outer circumferential surface of the wheel hub. Thus, it is possible, due to the bearing of third generation, to reduce the size and weight of the bearing and increase the strength of the wheel hub.

As clearly shown in the enlarged view of FIG. 2, the inboard sealing device 10 includes an annular seal 11 fitted on the outer circumferential surface of the end of outer member 1 of the stationary side. A pulsar ring 14 is fitted on the outer circumferential surface of larger diameter of inner ring 4 of the rotary side. The seal 11 has a core member 12 and a sealing member 13. The core member 12 has a cylindrical portion 12a, a radially extending portion 12b, extending radially from the end of the cylindrical portion 12a, and a base portion 12c. The core member 12 has a substantially "U"-shaped cross-section configuration. The core member 12 is made by press working non-magnetic steel sheet, e.g. austenitic-stainless steel sheet (JIS SUS 304 etc.) or preserved cold rolled steel sheet (JIS SPCC etc.).

The sealing member 13 has a pair of sealing lips 13a and 13b slidably contacting the outer circumferential surface of the inner ring 4. Sealing lip 13c projects from the cylindrical portion 12a of the core member 12 and slidably contacts the inner circumferential surface of the axle housing H. A garter spring 13d, to apply a predetermined urging force to the sealing lip 13b, is bonded to the core member 12 via vulcanization. Although the sealing member 13 is shown to have the garter spring 13d, it is possible any other sealing member in accordance with its mounting space or circumstances may be used.

The pulsar ring 14 includes a core member 15 and an encoder 16. The core member 15 includes a cylindrical portion 15a, fitted on the outer circumferential surface of the inner ring 4, and a cylindrical holding portion 15b. The core member 15 is made by press working a ferromagnetic steel sheet, e.g. ferrite-stainless steel sheet (JIS SUS 430 etc.) or preserved cold rolled steel sheet (JIS SPCC etc.).

The encoder 16, formed with mingled magnetic material powder at its radially outward side, is bonded to the holding portion 15b via vulcanization. The encoder 16 is made of elastomer material such as rubber. Magnetic material powder, such as ferrite powder, is mingled and N and S poles are alternately magnetized at a predetermined pitch along the circumferential direction. This forms a magnetic rotary encoder to detect the number of rotations of the wheel W. It is possible to increase the magnetic force of the encoder 16 and to prevent an adverse effect of the core member 12 of the seal 11 to the sensing ability by making the core member 15 of the pulsar ring 14 of a magnetic steel sheet and by making the core member 12 of the seal 11 as a non-magnetic steel sheet. Although the encoder 16 is shown as made of an elastomer, it is possible to make the encoder 16 from any other material, such as a sintered material where ferromagnetic material powder is mingled or mixed with metal binder.

According to this embodiment, the detecting sensor 17 is mounted to the bearing by being passed through the axle housing H and the cylindrical portion 12a of the core member 12. The detecting sensor 17 is fastened to the outer circumferential surface of the axle housing H by a bolt 19 via a fitting 18. In addition the detecting sensor 17 is mounted on the axle housing H through a through-passage 21 via an O-ring 20. A detecting portion 17a, at a tip end, is opposite to the encoder 16 forming a predetermined air gap.

By adopting such a structure, the seal member 13 prevents leakage of lubricating grease contained within the bearing while also preventing penetration of rain water or dust into the bearing from the ambient circumstance. In addition, the sealing device 10 can protect the encoder 16 and prevents reduction of sensing ability which would be caused by adhesion of abraded metal powder on the surface of the encoder 16. Furthermore, it is possible to provide a vehicle wheel rolling bearing with a sealing device integrated with a magnetic encoder 16 that protects the encoder and improves the sensing ability of the detecting sensor. In addition, since the detecting sensor 17 is arranged directly opposite the encoder 16, without any obstruction such as the cover member, it is possible to reduce the air gap between the two. This remarkably improves the sensing ability as well as the detecting accuracy.

Figure 3:
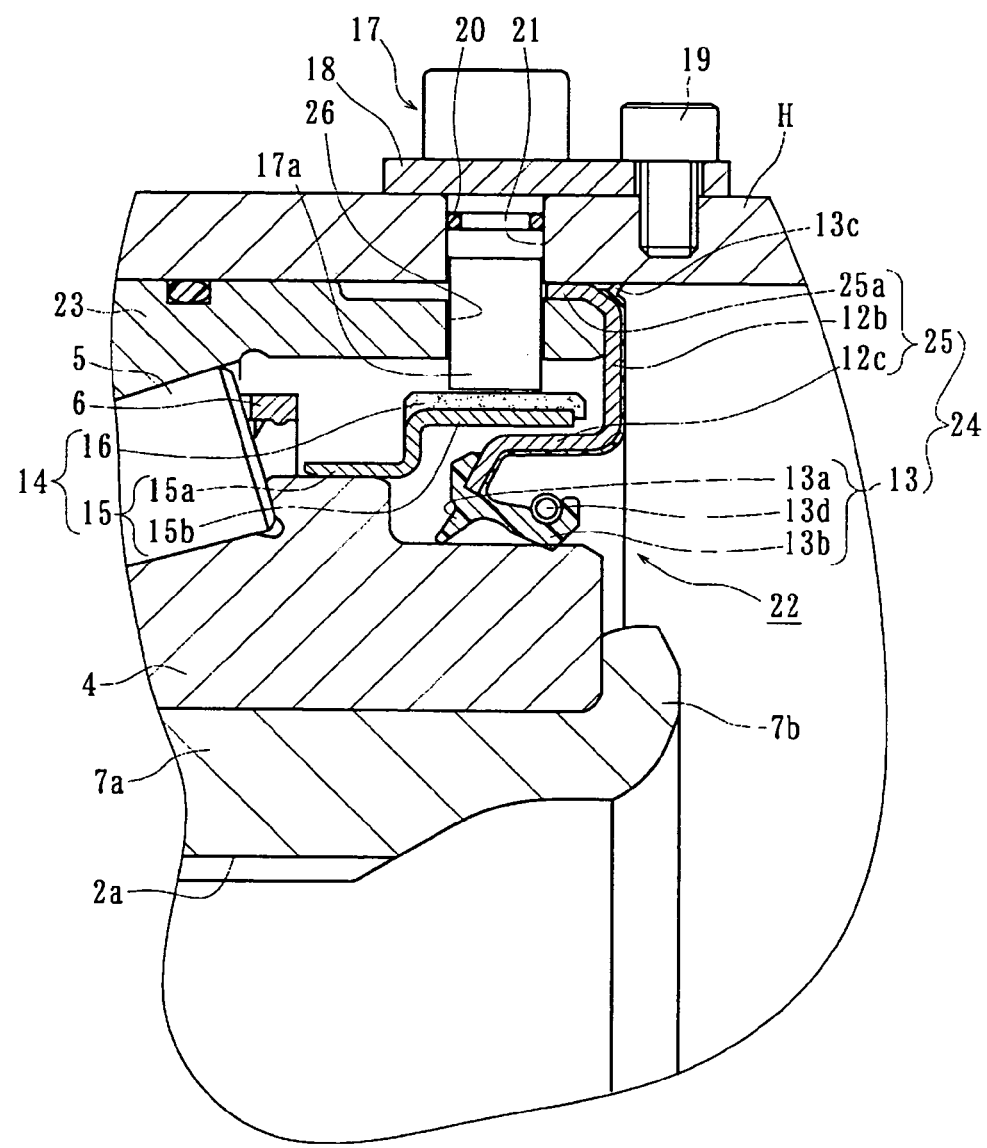
FIG. 3 is a partially enlarged longitudinal-section view of a second embodiment of a vehicle wheel bearing of the semi-float type of the present invention.
Figure 4:
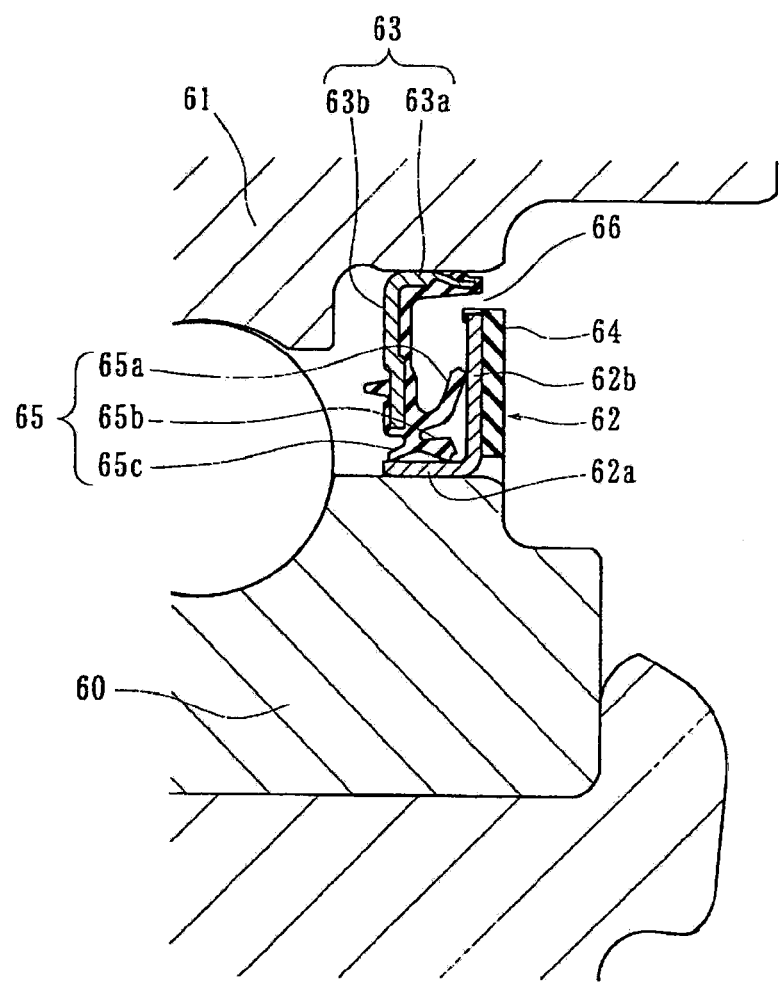
FIG. 4 is a partially enlarged longitudinal-section view of a bearing for a wheel of vehicle of the prior art.
Figure 5:
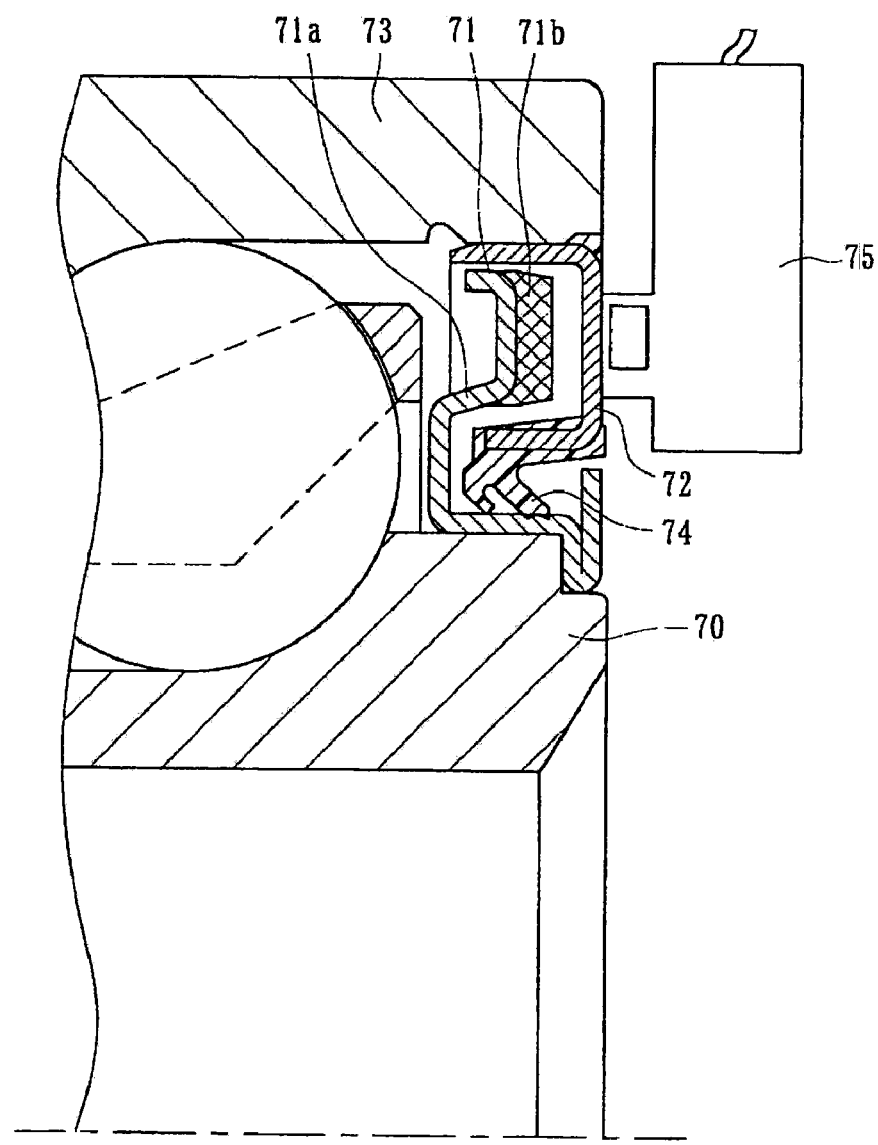
FIG. 5 is a partially enlarged longitudinal-section view of an another bearing for a wheel of vehicle of the prior art.

FIG. 3 shows a second embodiment of the vehicle wheel bearing with a sealing device integrated with a magnetic encoder. Since differences between this embodiment and the first embodiment only resides in the structure of the sealing device and a mounting portion of the detecting sensor, the same numerals are used, as those used in the first embodiment, to designate the same structural elements.

A second inboard sealing device 22 of the second embodiment includes an annular seal 24 fitted on one end of an outer member 23 forming the stationary side. A pulsar ring 14 is mounted on an end of a larger diameter of the inner member 4 forming the rotary side. A seal 24 includes a core member 25 and the sealing member 13. The core member 25 includes a cylindrical portion 25a fitted on the outer circumferential portion of the outer member 23. A radially extending portion 12b extends radially from the end of the cylindrical portion 25a. The core member 25 includes a base portion 12c and is formed in a substantially "U"-shaped cross-section configuration. The core member 25 is made by press working a non-magnetic steel sheet, e.g. austenitic-stainless steel sheet (JIS SUS 304 etc.) or preserved cold rolled steel sheet (JIS SPCC etc.).

According to the second embodiment, the detecting sensor 17 is mounted to the bearing by being passed through the axle housing H and the inboard end of the outer ring 23. The detecting sensor 17 is mounted on the axle housing H through a through-passage 21, as well as a through-passage 26 in the end of the outer ring 23, via the O-ring 20. The detecting portion 17a, at a tip end, opposes the encoder 16 via a predetermined air gap. This enables the detecting sensor 17 to be stably positioned and mounted.

As described above, the vehicle wheel rolling bearing according to the present invention comprises an inner member with a wheel hub integrally formed with a wheel mounting flange at an outboard side end. The wheel hub is integrally formed with a stepped portion, of smaller diameter, axially extending from the wheel mounting flange. An inner ring is fitted on the stepped portion. The inner ring outer circumferential surface has at least one of the double row inner raceway surfaces. An outer member, mounted on a stationary member, is formed with double row outer raceway surfaces on its inner circumferential surface opposite to the inner raceway surfaces. Double row rolling elements are arranged between the outer and inner members. Sealing devices seal annular spaces between the outer and inner members. An inboard sealing device of the sealing devices includes an annular seal fitted on one end of the outer member forming the stationary side. A pulsar ring is mounted on an end of larger diameter of the inner member forming the rotary side. The pulsar ring has an encoder mounted on a cylindrical holding portion arranged opposite to the annular seal. The encoder includes magnetic poles formed by magnetic powder alternating the polarity along its circumferential direction. A detecting sensor is arranged passing through the cylindrical portion of the seal or through the end of the outer member. The detecting sensor opposes the encoder and keeps a predetermined air gap between the two. The seal prevents leakage of lubricating grease contained within the bearing while also preventing penetration of rain water or dust into the bearing from the ambient circumstance. In addition, it is possible to provide a vehicle wheel rolling bearing with a sealing device integrated with a magnetic encoder which can protect the encoder and improve the sensing ability of the detecting sensor. Furthermore, since the detecting sensor directly opposes the encoder without any obstruction such as a cover member, it is possible to reduce the air gap between the two and thus, remarkably improve the sensing ability as well as the detecting accuracy.

The vehicle wheel bearing of the semi-float type according to the invention includes an axle housing supported under a body of the vehicle. An extending driving shaft passes through the axle housing and connects to an inner member of the rolling bearing arranged between the driving shaft and an opening of the axle housing to transmit torque between the driving shaft and the inner member. This semi-float type bearing makes it possible to prevent leakage of lubricating grease contained within the bearing and also prevents penetration of lubricating oil from the differential apparatus to the bearing. Further, it is possible to protect the encoder and to prevent attraction of abraded powder mingled in the lubricating oil near or on the encoder and thus prevent the reduction of the sensing ability.

The present invention has been described with reference to the preferred embodiment. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. A vehicle rolling bearing comprising:
    an inner member including an inner ring and a wheel hub integrally formed with a wheel mounting flange at an outboard side end, said wheel hub including an integrally formed stepped portion of smaller diameter axially extending from the wheel mounting flange toward an inboard end, said inner ring fitted on the stepped portion, said inner ring outer circumferential surface having at least one double row inner raceway surfaces;
    an outer member mounted on a stationary member and formed with double row outer raceway surfaces on an inner circumferential surface opposite to the inner raceway surfaces;
    double row rolling elements arranged between the outer and inner members;
    sealing devices for sealing annular spaces between the outer and inner members;
    an inboard sealing device including an annular seal with a first portion fitted on one end of the outer member forming a stationary side, said annular seal including a sealing portion on the inner member at the inboard end of the wheel hub; a pulsar ring mounted on said inboard end of the inner member forming a rotary side; said pulsar ring sealed between said inner and outer members by said annular seal, and said pulsar ring positioned radially between said first portion and said sealing portion of said annular seal, an encoder mounted on a cylindrical holding portion arranged opposite to the annular seal, said encoder including magnetic poles formed by magnetic powder and alternating the polarity along its circumferential direction;
    a detecting sensor passing through the cylindrical portion of the seal or through the one end of the outer member and opposing the encoder to keep a predetermined air gap between the encoder and detecting member.

2. The rolling bearing of claim 1, wherein the inboard sealing device annular seal having an "U" shaped cross-section with a cylindrical portion fitted on the outer circumferential surface of the end of the outer member; and said pulsar ring having the cylindrical holding portion arranged opposite to the cylindrical portion of the seal and mounting the encoder on said cylindrical holding portion.

3. The rolling bearing of claim 1, wherein one of the double row inner raceway surfaces is formed directly on the outer circumferential surface of the wheel hub, and the other of the double row inner raceway surfaces is formed on the outer circumferential surface of the inner ring.

4. The rolling bearing of claim 1, wherein the inboard side end of the wheel hub is plastically deformed radially outward to form a caulked portion to axially secure the inner ring relative to the wheel hub.

5. The rolling bearing of claim 1, wherein core members of the pulsar ring and seal are formed by press working steel sheet, and the core member of the pulsar ring is made of magnetic steel sheet and the core member of the seal is made of non-magnetic steel sheet.

6. The bearing for a vehicle wheel comprising:
    an axle housing supported under a body of vehicle;
    a driving shaft extending through the axle housing and connected to an inner member of a vehicle wheel rolling bearing of claim 1 arranged between the driving shaft and an opening of the axle housing so as to transmit torque between the driving shaft and the inner member.

7. The bearing of claim 6 wherein the driving shaft and the inner member are detachably connected to each other via a serration means.

8. The bearing of claim 6 wherein the seal has integrally formed sealing lips in intimate contact with an inner surface of the axle housing.

9. A vehicle rolling bearing comprising:

an inner member including an inner ring and a wheel hub integrally formed with a wheel mounting flange at an outboard side end, said wheel hub including an integrally formed stepped portion of smaller diameter axially extending from the wheel mounting flange toward an inboard end, said inner ring filled on the stepped portion, said inner ring outer circumferential surface having at least one double row inner raceway surfaces;

an outer member mounted on a stationary member and formed with double row outer raceway surfaces on an inner circumferential surface opposite to the inner raceway surfaces;

double row rolling elements arranged between the outer and inner members;

sealing devices for sealing annular spaces between the outer and inner members;

an inboard sealing device including an annular seal with a first portion fitted on one end of the outer member forming a stationary side, said annular seal including a sealing portion on the inner member at the inboard end of the wheel hub; a pulsar ring mounted on said inboard end of the inner member forming a rotary side; said pulsar ring sealed between said inner and outer members by said annular seal, and said pulsar ring positioned radially between said first portion and said sealing portion of said annular seal, an encoder mounted on a cylindrical holding portion arranged opposite to the annular seal, said encoder including magnetic poles formed by magnetic powder and alternating the polarity along its circumferential direction;

a detecting sensor passing through a passage in an axle housing and said detecting sensor passing through the cylindrical portion of the seal or through the one end of the outer member and said detecting sensor opposing the encoder to keep a predetermined air gap between the encoder and detecting sensor.

* * * * *